No. 668,639. Patented Feb. 26, 1901.
C. E. HADLEY.
MOTOR ROAD VEHICLE.
(Application filed July 8, 1899.)
(No Model.)
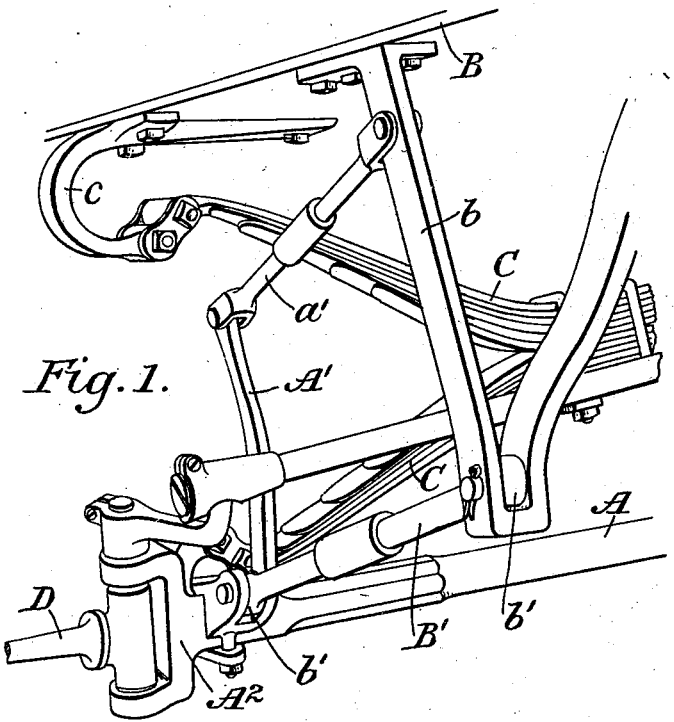
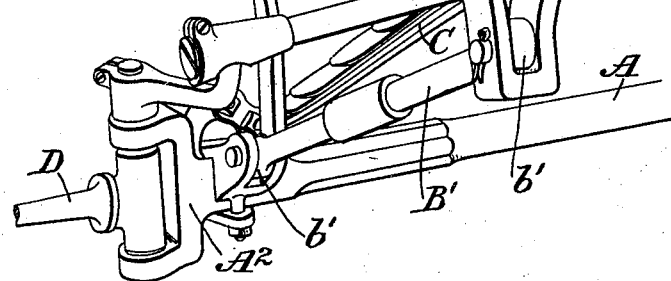
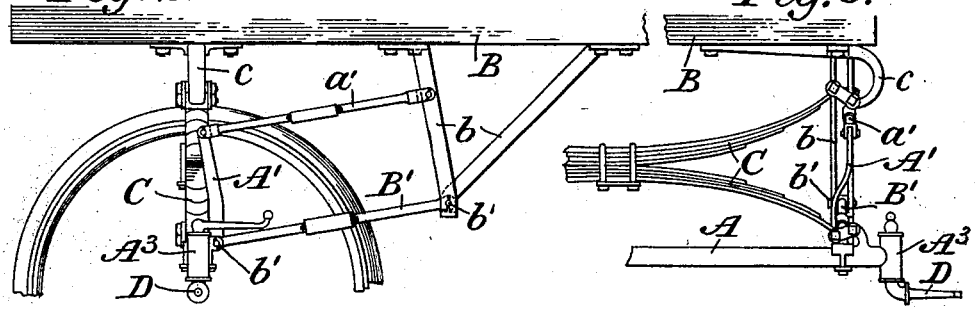

UNITED STATES PATENT OFFICE.

CHARLES E. HADLEY, OF HARTFORD, CONNECTICUT, ASSIGNOR TO THE COLUMBIA AND ELECTRIC VEHICLE COMPANY, OF SAME PLACE AND JERSEY CITY, NEW JERSEY.

MOTOR ROAD-VEHICLE.

SPECIFICATION forming part of Letters Patent No. 668,639, dated February 26, 1901.

Application filed July 8, 1899. Serial No. 723,132. (No model.)

*To all whom it may concern:*

Be it known that I, CHARLES E. HADLEY, a citizen of the United States, residing at Hartford, county of Hartford, State of Connecticut, have invented certain new and useful Improvements in Motor Road-Vehicles, of which the following is a specification, reference being had to the accompanying drawings, forming a part hereof.

This invention relates to self-propelled road-vehicles as distinguished from vehicles which run upon fixed tracks. The running-gear of such vehicles is subject to unusual strains, particularly in the case of the axles, which must be so supported as to be free to move vertically with respect to the body, but must be held from movement in a horizontal plane. Moreover, the axles which support independent steering-wheels by means of stub-axles, particularly when the axis of the wheels is above or below the axis of the main axle, are subject to a twisting strain.

It is the object of this invention to provide improved means for supporting the axles of vehicles of the class referred to so that the desired freedom for vertical movement shall not be interfered with, while the strains referred to shall be resisted successfully.

In accordance with the invention an arm substantially or nearly vertical is secured rigidly against rotation on the axle and is engaged by a link or pivoted rod which permits movement of such arm in the direction of its length, while it prevents displacement and particularly twisting of the axle.

The invention is more fully described hereinafter, with reference to the accompanying drawings, in which the same is illustrated in several practical embodiments.

In the drawings, Figure 1 is a rear perspective view of a portion of a running-gear frame which embodies the invention. Figs. 2 and 3 are, respectively, a side elevation and a front elevation of similar parts of a running-gear frame, the disposition of the stub-axle being slightly different.

In the several figures of the drawings the main axle A is represented as suspended from or secured to the body B by suitable springs C, which permit of relative vertical movement between the axle and the body. The resistance of the axle to thrust fore and aft is positively assured by jack-bolts $B'$, one at each end of the axle, which have a hinge or link connection with the axle, as in the socket $b'$ of a clip on the axle, and with the body or a fixed part of the running-gear frame, so as to permit of the free vertical movement of the axle with respect to the body. The point of connection of the jack-bolts to the body is lowered toward the plane of the axle by a bracket $b$, which is secured rigidly to the body and has the jack-bolt connected to its lower end.

An arm $A'$, as shown in the several figures of the drawings, either vertical, or nearly so, is secured rigidly against rotation on the axle A, preferably by a clip, as shown in the drawings, and is connected by a link or adjustable pivoted rod $a'$ with the fixed bracket $b$, the arms $A'$ and $b$ and links or rods $a'$ and $B'$ being preferably arranged substantially in a parallelogram. This arrangement prevents twisting of the axle and at the same time permits free vertical movement of the axle with respect to the body of the vehicle.

In Fig. 1 of the drawings the stub-axle D is shown as supported by a yoke $A^2$ on the end of the main axle A, with the axis of the stub-axle substantially in line with the axis of the main axle, while in the remaining figures of the drawings the stub-axle D is shown as supported by a socket $A^3$, with the axis of the stub-axle considerably below the axis of the main axle; but these and other variations involve merely a difference in the degree and character of the strains to which the main axle is subject and are not otherwise material to the character or scope of the invention.

I claim as my invention—

1. In a motor road-vehicle, the combination with the wheels, axle, body, and springs connecting the axle and body, of a substantially vertical arm rigidly secured against rotation on the axle, and a link connected to a fixed point and to said arm, substantially as shown and described.

2. In a motor road-vehicle, the combination with the wheels, axle, body, and springs connecting the axle and body, of a substantially vertical arm rigidly secured against rotation on the axle, a bracket secured to the body, and substantially parallel links connecting the arm and the axle with the bracket, substantially as shown and described.

3. In a motor road-vehicle, the combination with the wheels, axle, body and springs connecting the axle and body, of a substantially vertical arm rigidly secured to the axle, a bracket secured to the body, and pivoted rods intermediate of the arm and bracket, said rods, arm and bracket being so disposed as to form substantially a parallelogram, substantially as shown and described.

4. In a motor road-vehicle, the combination with the wheels, axle, body and springs connecting the axle and body, of an arm vertically disposed with relation to the axle and having at one end a clip whereby it is rigidly secured to the axle, a bracket depending from the vehicle-body, and an adjustable pivoted rod connecting the arm and bracket, substantially as shown and described.

5. In a motor road-vehicle, the combination with the wheels, axle, body and springs connecting the axle and body, of a bracket mounted adjacent to the axle, a clip secured to the axle and having a socket, an arm integral with said clip and extending transversely of the axle, and adjustable rods pivoted to said bracket, one of said rods being pivoted in the socket of said clip and the other being pivoted near the end of said arm.

This specification signed and witnessed this 30th day of June, A. D. 1899.

CHARLES E. HADLEY.

In presence of—
WILLIAM F. D. CRANE,
HERMAN F. CUNTZ.